(12) United States Patent
Akama

(10) Patent No.: US 8,270,971 B2
(45) Date of Patent: Sep. 18, 2012

(54) PORTABLE TERMINAL DEVICE INITIALIZING METHOD

(75) Inventor: Katsuaki Akama, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 289 days.

(21) Appl. No.: 12/637,146

(22) Filed: Dec. 14, 2009

(65) Prior Publication Data

US 2010/0093348 A1  Apr. 15, 2010

Related U.S. Application Data

(63) Continuation of application No. PCT/JP2007/000812, filed on Jul. 30, 2007.

(51) Int. Cl.
*H04W 4/00* (2009.01)

(52) U.S. Cl. ............... 455/435.1; 455/558; 709/227

(58) Field of Classification Search ............... 455/435.1, 455/558; 709/227
See application file for complete search history.

(56) References Cited

U.S. PATENT DOCUMENTS

| | | | |
|---|---|---|---|
| 7,996,042 B2 * | 8/2011 | Noh | 455/558 |
| 2005/0266885 A1 | 12/2005 | Katayanagi | |
| 2006/0116169 A1 | 6/2006 | Park | |

FOREIGN PATENT DOCUMENTS

| | | |
|---|---|---|
| JP | 2001-292222 | 10/2001 |
| JP | 2002-118877 | 4/2002 |
| JP | 2004-64657 | 2/2004 |
| JP | 2005-340976 | 12/2005 |
| JP | 2006-157913 | 6/2006 |
| JP | 2007-19897 | 1/2007 |
| JP | 2007-166123 | 6/2007 |

* cited by examiner

*Primary Examiner* — Amancio Gonzalez
(74) *Attorney, Agent, or Firm* — Staas & Halsey LLP

(57) ABSTRACT

To provide an initialization method that enables a portable terminal device to be initialized with a remote operation even if an insertable/removable user information storing unit is replaced with one possessed by a third party in the portable terminal device that performs an incoming/outgoing operation on the basis of identification information registered to the user information storing unit, a communication system includes a portable terminal device that obtains first identification information and second identification information from a user information history storing unit and notifies a switch of the obtained information, and a switch that searches for the second identification information in an initialization target storing unit, and instructs the portable terminal device into which the user information storing unit to which the first identification information is registered is inserted to initialize data upon detection of the second identification information.

7 Claims, 6 Drawing Sheets

PORTABLE TERMINAL DEVICE INITIALIZING METHOD

CROSS-REFERENCE TO RELATED APPLICATIONS

This application is a continuation of PCT application of PCT/JP2007/000812, which was filed on Jul. 30, 2007.

FIELD

The present invention relates to a method for initializing data held by a portable terminal device such as a cellular phone, etc.

BACKGROUND

In recent years, portable terminal devices such as cellular phones and the like have been increasingly utilized with improvements in their functions in the business world. Accordingly, the number of cases where important data is held in a portable terminal device has been growing.

However, portable terminal devices tend to be lost or stolen, while their portability has been improved with reductions in size and weight.

Accordingly, techniques for preventing information leakage by initializing data held in a portable terminal device with a remote operation performed for the portable terminal device through a message communication, etc. when it is lost or stolen have been devised.

As for the above described technique, Patent Document 1 discloses a mobile communication terminal that determines the legality of an IC card on the basis of particular information read from the IC card when the IC card is inserted into the mobile communication terminal, and controls terminal operations including incoming/outgoing operations in accordance with a determination result.

Additionally, Patent Document 2 discloses the mobile communication terminal initialization method that reduces an initialization time by changing an initialization process in accordance with a result of making a comparison between an IMSI already stored in a storage device included in the mobile communication terminal and an IMSI of a SIM card inserted into the mobile communication terminal.

Patent Document 1: Japanese Laid-open Patent Publication No. 2004-064657

Patent Document 2: Japanese Laid-open Patent Publication No. 2006-157913

SUMMARY

The present invention was devised in light of the above described problems, and an object thereof is to provide an initialization method for enabling a portable terminal device to be initialized via remote operation even if a user information storing unit is replaced with one possessed by a third party in the portable terminal device into which the user information storing unit such as an IC card or the like to which user information and the like are registered is inserted and which performs an incoming/outgoing operation on the basis of identification information registered to the user information storing unit.

To attain the above described object, a communication system according to the present invention is a communication system where two or more portable terminal devices into which a user information storing unit to which information about a user is registered is inserted make a communication via a switch by performing an incoming/outgoing operation on the basis of incoming/outgoing information registered to the user information storing unit, and includes a portable terminal device that obtains first identification information, assigned to each user information storing unit, from a first user information storing unit upon detection of the first user information storing unit; stores the first identification information in a user information history storing unit; obtains the first identification information and second identification information registered to a second user information storing unit, inserted immediately before the first user information storing unit, from the user information history storing unit; notifies the switch of the first identification information and the second identification information; and initializes predetermined data within a storing unit included in the portable terminal device itself in accordance with an instruction from the switch; and also includes a switch that searches for the second identification information in an initialization target storing unit to which a portable terminal device to be initialized is registered upon receipt of the notification and which is intend to register the identification information registered to the user information storing unit inserted into the portable terminal device; replaces the second identification information with the first identification information upon detection of the second identification information; and instructs a portable terminal device into which the user information storing unit to which the first identification information is registered is inserted to initialize data.

The object and advantages of the embodiment will be realized and attained by means of the elements and combinations particularly pointed out in the claims.

It is to be understood that both the foregoing general description and the following detailed description are exemplary and explanatory and are not restrictive of the embodiment, as claimed.

DESCRIPTION OF EMBODIMENTS

As described previously, in a portable terminal device into which an IC card (such as a UIM (User Identity Module)) card) to which user information and the like is registered is inserted and which performs an incoming/outgoing operation on the basis of identification information registered to the IC card, there is a problem wherein a message communication may not be made with the portable terminal device if the IC card is replaced with one possessed by a third party, and data may not be initialized (or deleted) with a remote operation.

An embodiment according to the present invention is described below with reference to FIGS. 1 to 5.

Figure 1:
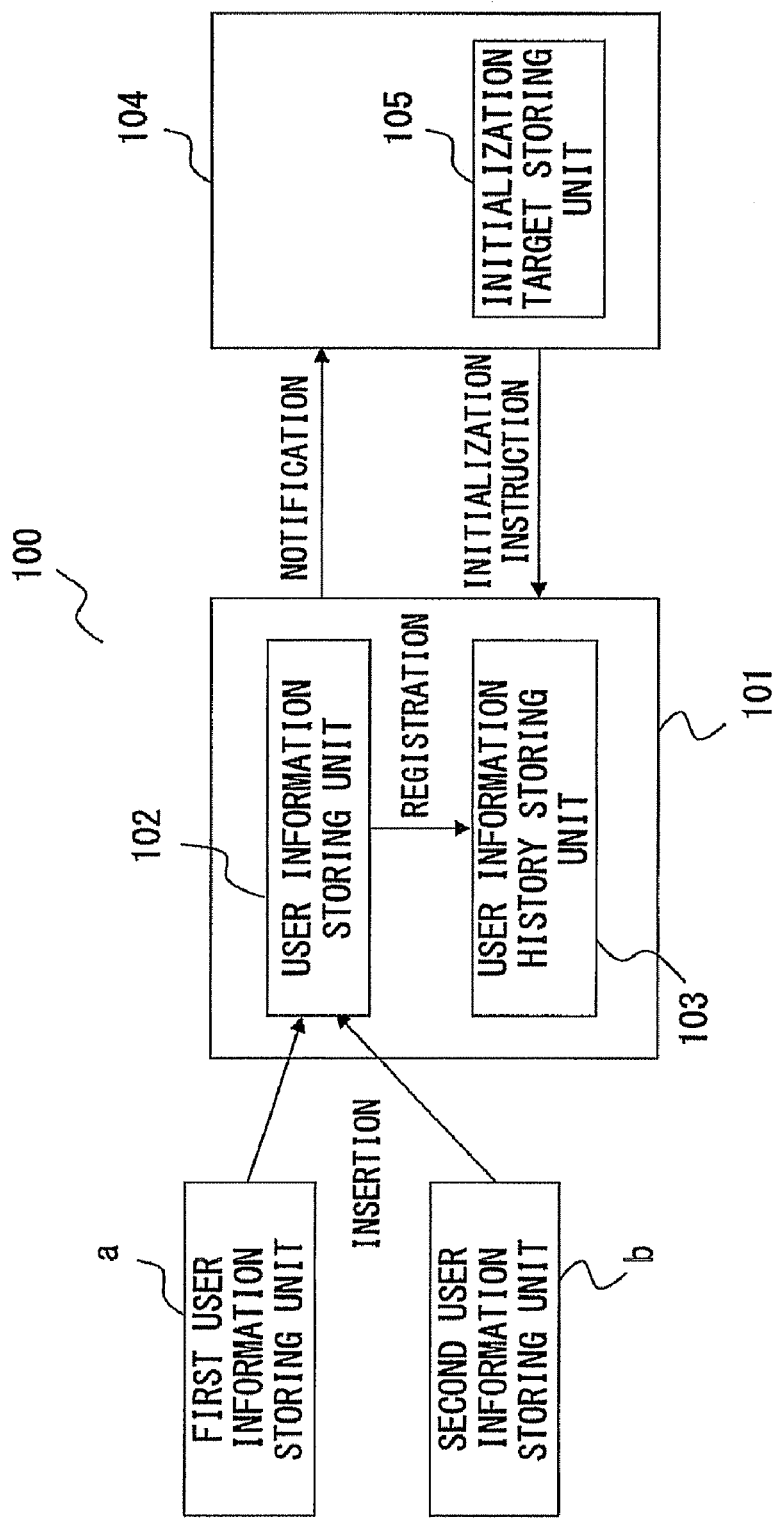
FIG. 1 is a schematic diagram for explaining operations of a communication system according to an embodiment of the present invention.

FIG. 1 is a schematic diagram for explaining operations of a communication system according to the embodiment of the present invention.

The communication system 100 illustrated in FIG. 1 includes a portable terminal device 101 into which a user information storing unit 102 is inserted and which performs an incoming/outgoing operation on the basis of incoming/outgoing information registered to the user information storing unit 102, and a switch 104 that coupled to certain base stations not illustrated in accordance with an incoming/outgoing operation of the portable terminal device 101 so as to enable a communication between portable terminal devices 101.

The portable terminal device 101 includes the user information storing unit 102, to which information about a user, identification information for identifying the user information storing unit 102, and incoming/outgoing information used for incoming/outgoing operations are registered, which is insertable.

For example, the portable terminal device 101 is configured so that a first user information storing unit a is inserted and a second user information unit b may be inserted after the first user information storing unit a is removed.

The portable terminal device 101 performs an incoming/outgoing operation on the basis of incoming/outgoing information registered to the first user information storing unit a if the first user information storing unit a is inserted, or performs an incoming/outgoing operation on the basis of incoming/outgoing information registered to the second user information storing unit b if the second user information storing unit b is inserted.

The portable terminal device 101 also includes a user information history storing unit 103 for storing the history of inserted user information storing units 102. In the user information history storing unit 103, for example, identification information and incoming/outgoing information, which are obtained from the inserted user information storing unit 102, are stored.

In the meantime, the switch 104 includes an initialization target storing unit 105 for registering the portable terminal device 101 the data of which is to be initialized. To the initialization target storing unit 105, for example, identification information and incoming/outgoing information which are registered to the user information storing unit 102 inserted into the portable terminal device 101 the data of which is to be initialized are registered.

When the user information storing unit 102 is inserted, the portable terminal device 101 obtains the identification information and the incoming/outgoing information from the user information storing unit 102, and registers the obtained information to the user information history storing unit 103.

At the same time, the portable terminal device 101 notifies the switch 104 of the respective two latest pieces of identification information and incoming/outgoing information among the identification information and the incoming/outgoing information which are registered to the user information history storing unit 103.

Here, assume that the latest identification information is first identification information and that the second latest identification information is second identification information. Similarly, assume that the latest incoming/outgoing information is first incoming/outgoing information and that the second latest incoming/outgoing information is second incoming/outgoing information.

The switch 104 that receives the notification searches for the second identification information in the initialization target storing unit 105. If the switch 104 detects the second identification information registered to the initialization target storing unit 105, it replaces the second identification information and the second incoming/outgoing information with the first identification information and the first incoming/outgoing information, and instructs the portable terminal device 101 into which the user information storing unit 102 to which the first identification information is registered is inserted to initialize data by making a message communication on the basis of the first incoming/outgoing information.

Upon receiving the data initialization instruction from the switch 104, the portable terminal device 101 initializes predetermined data stored in a storing unit that is included in the portable terminal device 101 itself; the storing unit is not illustrated.

A specific configuration example of the above described communication system is described below.

Figure 2:
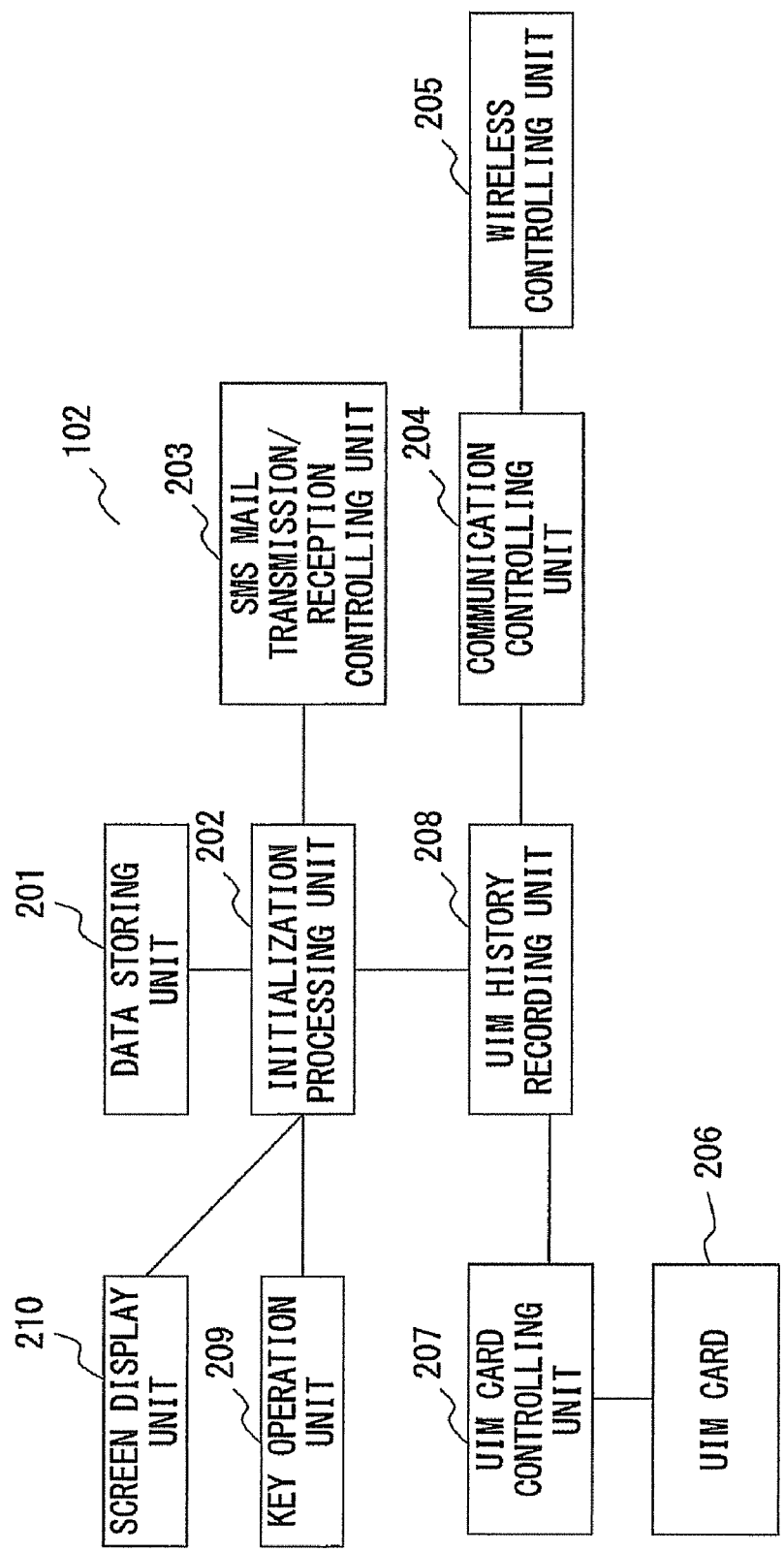
FIG. 2 is a block diagram illustrating a specific configuration example of a portable terminal device according to the embodiment of the present invention.

FIG. 2 is a block diagram illustrating a configuration example of the portable terminal device 101 according to the embodiment of the present invention.

The portable terminal device 101 illustrated in FIG. 2 includes a data storing unit 201 for storing the data of a user, an initialization processing unit 202 for initializing the data of the data storing unit 201 in accordance with an instruction from the switch 104, an SMS (Short Message Service) mail transmission/reception controlling unit 203 for controlling the transmission/reception of SMS mail used for a message communication with the switch 104 or the like, a communication controlling unit 204 for performing a communication control, a wireless controlling unit 205 for making a wireless communication with a base station in accordance with a used wireless standard, an insertable/removable UIM card 206, a UIM card controlling unit 207 for controlling an access to the UIM card 206, a key operation unit 209 used to operate the portable terminal device 101, and a screen display unit 210 for making an arbitrary display.

The data storing unit 201 is, for example, a memory configured with a flash ROM or the like for storing data that a user stores depending on need. For example, e-mail, text data, image data, etc. are stored.

The initialization processing unit 202 makes a message communication with the switch 104 via the SMS mail transmission/reception controlling unit 203, the communication controlling unit 204, and the wireless controlling unit 205. In this embodiment, a message communication using SMS mail is used as a communication with the switch 104. However, the communication with the switch 104 is not limited to the message communication. The communication may be made with the switch 104 by using another communication means depending on need.

Upon receiving the data initialization instruction from the switch 104, the initialization processing unit 202 initializes predetermined data stored in the data storing unit 201. Alternatively, the predetermined data may be simply deleted.

Here, particular data (such as a storage area, a data type, etc.) may be predetermined in the initialization instruction from the switch 104. In this case, only particular data specified with the initialization instruction from the switch 104 may be initialized.

Upon detecting the insertion of the UIM card 206 via the UIM card controlling unit 207, the UIM history storing unit 208 obtains a UIM number and an SMS mail transmission destination number, which are registered to the UIM card 206, and stores the obtained numbers in the UIM history table.

At the same time, the UIM history storing unit 208 obtains the two latest UIM numbers among UIM numbers registered to a UIM history table. Then, the UIM history storing unit 208 notifies the switch 104 of the obtained UIM numbers and the SMS mail transmission destination number via the SMS mail transmission/reception controlling unit 203, the communication controlling unit 204, and the wireless controlling unit 205.

Assume that the latest UIM number (the UIM number registered last) is a first UIM number, and that the second latest UIM number (the UIM number registered immediately before the first UIM number) is a second UIM number. Also assume that the latest SMS mail transmission destination number is a first SMS mail transmission destination number, that the second latest SMS mail transmission destination number is a second SMS mail transmission destination number.

Here, the UIM card is a specific example of the user information storing unit 102 illustrated in FIG. 1. Additionally, the UIM number is a specific example of the identification information in FIG. 1. The SMS mail transmission destination number is a specific example of the incoming/outgoing information described with reference to FIG. 1. For example, if the switch 104 makes a message communication with the portable terminal device 101, incoming/outgoing operations based on the SMS mail transmission destination number are performed. Moreover, the UIM history table is a specific example of the user information history storing unit 103.

Figure 3:
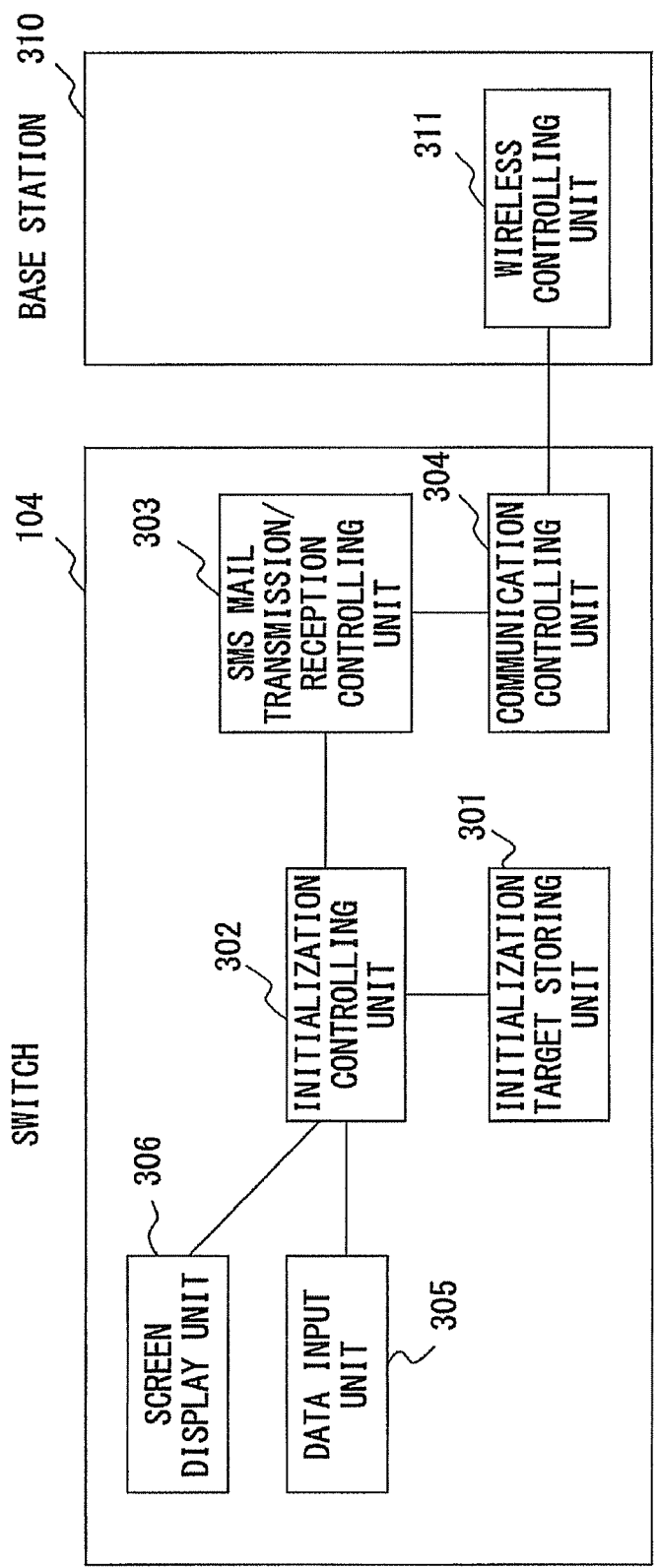
FIG. 3 is a block diagram illustrating a specific configuration of a switch according to the embodiment of the present invention.

FIG. 3 is a block diagram illustrating a specific configuration example of the switch 104 according to the embodiment of the present invention.

The switch 104 illustrated in FIG. 3 includes an initialization target storing unit 301 for storing data to be initialized, an initialization controlling unit 302 for determining whether or not the portable terminal device 101 of a notified UIM number is a target device the data of which is to be initialized and for instructing the portable terminal device 101 to initialize the data, an SMS mail transmission/reception controlling unit 303 for controlling the transmission/reception of SMS mail used for a message communication with the portable terminal device 101, a communication controlling unit 304 for performing a communication control, a data input unit 305 used to register, to the switch 104, a portable terminal device 101 to be initialized, and a screen display unit 306 for making an arbitrary display.

Additionally, the switch 104 is coupled to a base station 310 that makes a wireless communication with the portable terminal device 101. The base station 310 includes a wireless controlling unit 311 for making a wireless communication with the portable terminal device 101 in accordance with a used wireless standard.

When a user or the like inputs the UIM number and the SMS mail transmission destination number of the portable terminal device 101, the data of which is to be initialized, with the data input unit 305, the initialization target storing unit 301 obtains the UIM number and the SMS mail transmission destination number, and registers the obtained numbers to an initialization target table to which data to be initialized is registered.

The initialization controlling unit 302 makes a message communication with the portable terminal device 101 on the basis of the SMS mail transmission destination number via the SMS mail transmission/reception controlling unit 203, the communication controlling unit 204, and the wireless controlling unit 311.

Upon receiving the notification of the first and the second UIM numbers from the portable terminal device 101, the initialization controlling unit 302 searches for the second UIM number in the initialization target table. If the initialization controlling unit 302 detects the second UIM number in the initialization target table, it replaces the second UIM number and the second SMS mail transmission destination number with the first UIM number and the first SMS mail transmission destination number, starts a message communication with the portable terminal device 101 on the basis of the first SMS mail transmission destination number, and instructs the portable terminal device 101 to initialize the data.

To the initialization target table, a storage area and a data type (such as e-mail, image data, etc.) which is desired to be initialized may be registered. In this case, the storage area, the data type, or the like which is desired to be initialized may be reported to the portable terminal device 101 along with the initialization instruction.

Here, the initialization target table is a specific example of the initialization target storing unit 105 illustrated in FIG. 1.

Figure 4:
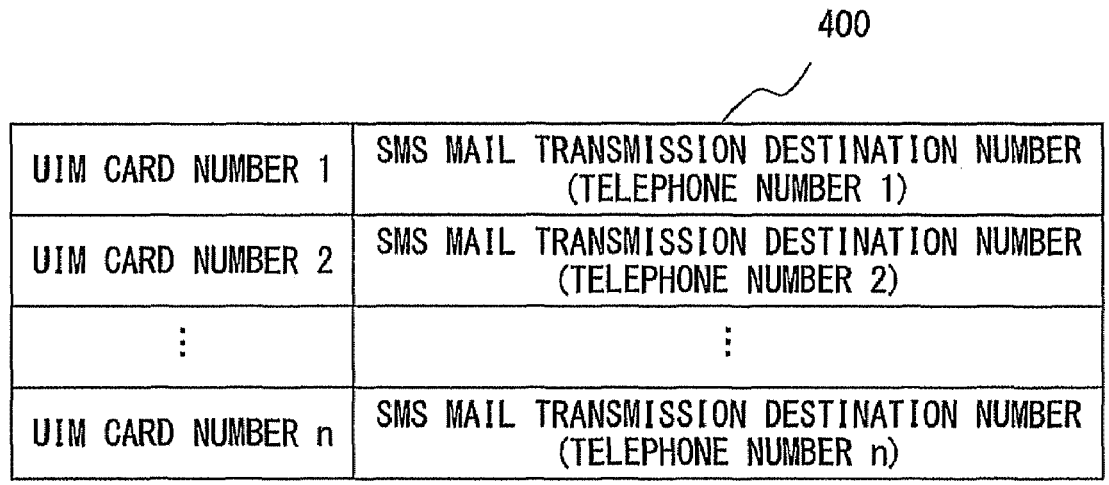
FIG. 4 is a schematic diagram illustrating a specific example of a UIM history table/initialization target table according to the embodiment of the present invention.

FIG. 4 illustrates a specific example of the UIM history table/initialization target table according to the embodiment of the present invention. Tables of the same configuration are used as the UIM history table and the initialization target table according to this embodiment. Since their configurations are the same, only the UIM history table is described below.

The UIM history table 400 illustrated in FIG. 4 includes a UIM number assigned to each UIM card 206, and an SMS mail transmission destination number (such as a telephone number). Both the UIM number and the SMS mail transmission destination number are information registered to the UIM card 206.

Figure 5A:
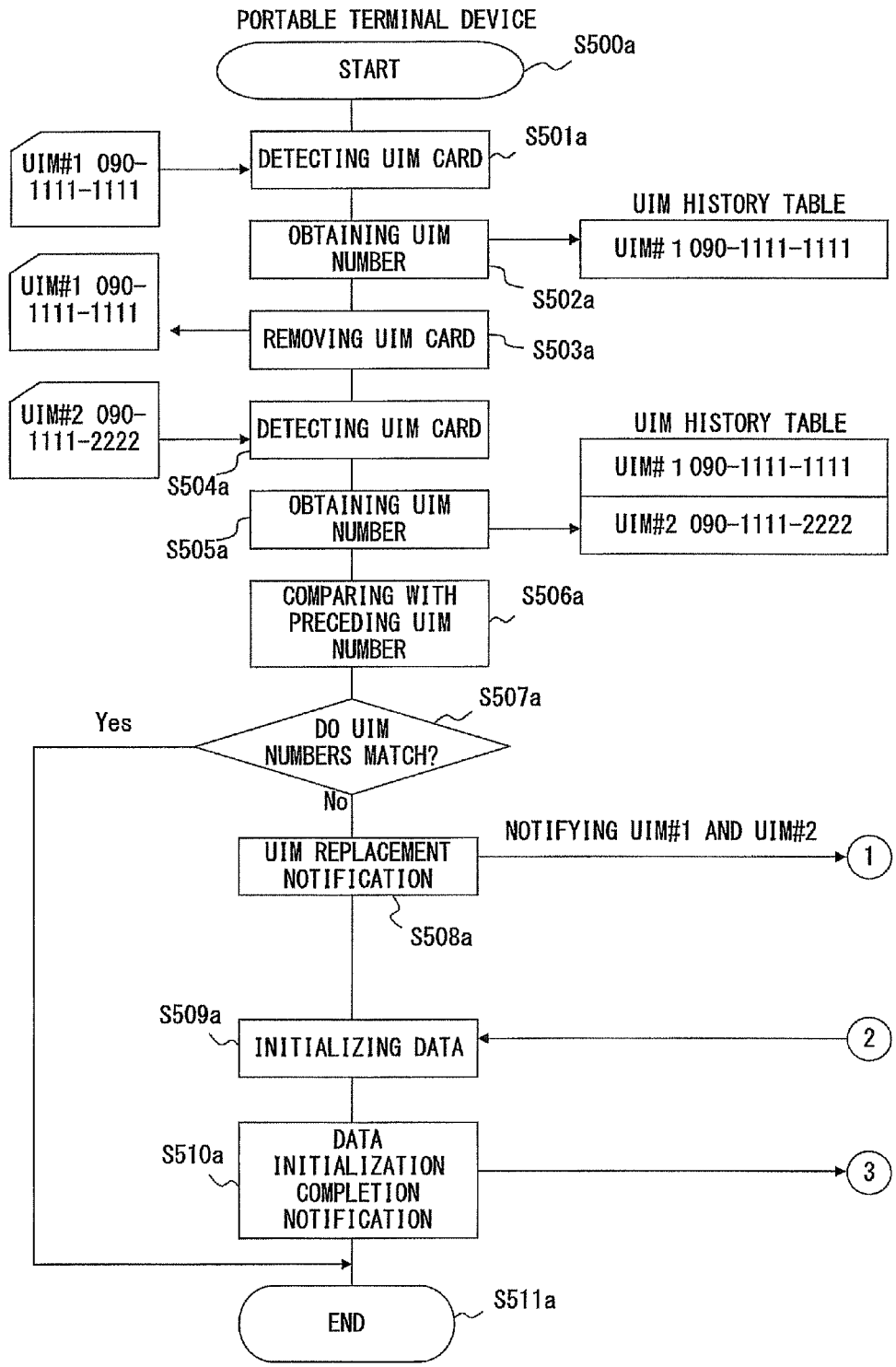
FIG. 5A is a flowchart illustrating specific operations of the communication system according to the embodiment of the present invention.
Figure 5B:
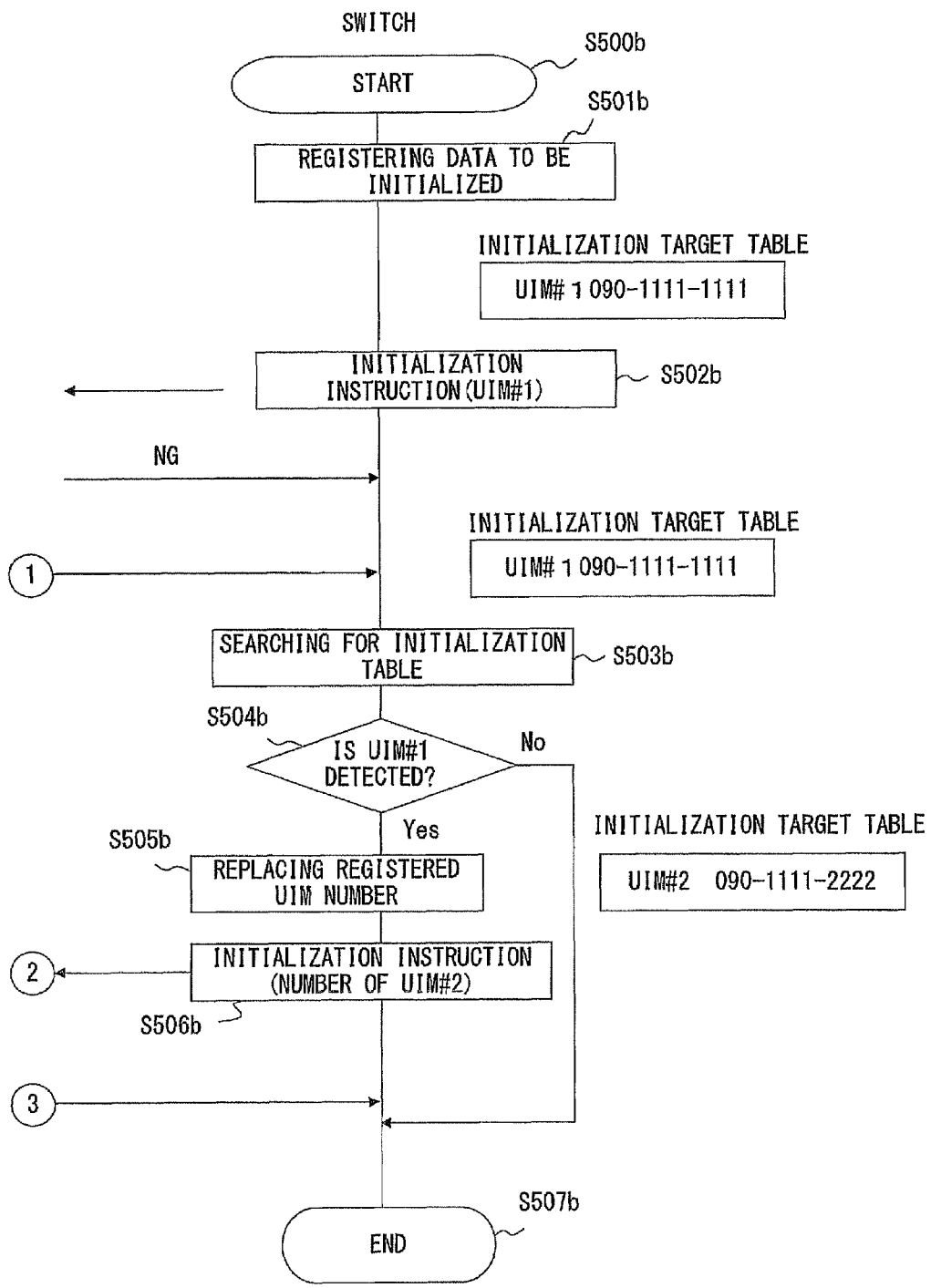
FIG. 5B is a flowchart illustrating specific operations of the communication system according to the embodiment of the present invention.

FIGS. 5A and 5B are a flowchart illustrating specific operations of the communication system 1000 according to the embodiment of the present invention.

When the UIM card 206 is inserted, the portable terminal device 101 detects the UIM card 206 in step S501a. Assume that the UIM number of the UIM card 206 and the SMS mail transmission destination number which are detected at this time are UIM#1 and 090-1111-1111, respectively.

In step S502a, the portable terminal device 101 obtains the UIM number and the SMS mail transmission destination number from the UIM card 206 and registers the obtained numbers to the UIM history table.

In step S503a, when the UIM card 206 is removed from the portable terminal device 101 and a new UIM card 206 is inserted, the portable terminal device 101 detects the newly inserted UIM card 206 in step S504a. Assume that the UIM number of the UIM card 206 and the SMS mail transmission destination number, which are detected at this time, are UIM#2 and 090-1111-2222, respectively.

In step S505a, the portable terminal device 101 obtains the UIM number and the SMS mail transmission destination number from the UIM card 206, and registers the obtained numbers to the UIM history table.

In step S506a, the portable terminal device 101 obtains the UIM number registered last, namely, the latest UIM number (UIM#2) registered to the UIM history table, and the UIM number registered immediately before the latest UIM number, namely, the second latest UIM number (UIM#1) by referencing the UIM history table, and makes a comparison between the UIM numbers.

If the UIM numbers do not match in step S507a, the portable terminal device 101 moves the process to step S508a. If the UIM numbers match, the portable terminal device 101 moves the process to step S511a to terminate the data initialization process.

In step S508a, the portable terminal device 101 notifies the switch 104 that the UIM card 206 is replaced, and also notifies the switch 104 of the UIM numbers (UIM#1 and UIM#2) along with the SMS mail transmission destination number.

In the meantime, when the user or the like inputs the UIM number of the UIM card 206 inserted into the portable terminal device 101, the data which is desired to be initialized, and the SMS mail transmission destination number, the switch 104 registers the UIM number and the SMS mail transmission destination number to the initialization target table in step S501b.

Assume that the UIM number and the SMS mail transmission destination number, which are input by the user or the like are UIM#1 and 090-11111-1111, respectively.

In step S502b, the switch 104 instructs the portable terminal device 101 into which UIM#1 registered to the initialization target table is inserted to initialize the data through a message communication based on 090-1111-1111.

However, since the UIM card of UIM#1 which is inserted into the portable terminal device 101 is removed and the UIM card of UIM#2 is inserted at this time, this communication fails.

In step S503b, the switch 104 searches for UIM#1 in the initialization target table upon receiving the notification of the UIM replacement from the portable terminal device 101.

The switch 104 moves the process to step S505b upon detection of UIM#1 as a result of the search in step S504b. Then, UIM#1 and 090-1111-1111, which are registered to the initialization target table, are replaced with UIM#2 and 090-1111-2222.

In step S506b, the switch 104 instructs the portable terminal device 101 into which the UIM card of UIM#2 is inserted to initialize the data through a message communication based on 090-1111-2222. Then, upon receiving from the portable terminal device 101 the notification that the data initialization process is complete, the switch 104 moves the process to step S507b to terminate the data initialization process.

In the meantime, upon receiving the data initialization instruction from the switch 104, the portable terminal device 101 into which the UIM card of UIM#2 is inserted executes the initialization process for predetermined data in step S509a.

Upon completion of the data initialization process, the portable terminal device 101 notifies the switch 104 in step S510a that the data initialization process is complete. Then, the portable terminal device 101 moves the process to step S511a to terminate the data initialization process.

As described above, the portable terminal device 101 according to this embodiment stores the UIM number of an inserted UIM card and an SMS mail transmission destination number in the UIM history table, and notifies the switch 104 of the UIM numbers (UIM#1, UIM#2) of the UIM cards inserted before and after the replacement and the SMS mail transmission destination numbers (090-1111-1111, 090-1111-2222) (step S508a).

Additionally, upon receiving the UIM numbers and the SMS mail transmission destination numbers from the portable terminal device 101 along with the UIM replacement notification, the switch 104 according to this embodiment checks whether or not the UIM number (UIM#1) before being replaced is registered to the initialization target table (step S503b).

Upon detection of the corresponding UIM number, the switch 104 replaces the UIM number (UIM#1) and the SMS mail transmission destination number (090-1111-1111) with the UIM number (UIM#2) and the SMS mail transmission destination number (090-1111-2222) after the replacement (step S505b), and makes a message communication based on the SMS mail transmission destination number (090-1111-2222) after the replacement so as to instruct the portable terminal device 101 to initialize the data.

As a result, even if the portable terminal device 101 that performs an incoming/outgoing operation on the basis of an SMS mail transmission destination number (or telephone number) registered to an insertable/removable UIM card enters a state in which it is unable to make a communication due to the replacement of the UIM card, the communication with the portable terminal device 101 is enabled. Additionally, a remote operation may be performed for the portable terminal device 101 through the communication. Furthermore, predetermined data held by the portable terminal device 101 may be initialized by instructing the portable terminal device 101 to initialize the data through the communication.

As described above, according to the embodiment, the portable terminal device obtains identification information from a user information storing unit upon detection of the user information storing unit, and stores the obtained information in the user information history storing unit. Then, the portable terminal device notifies the switch of the first identification information and the second identification information.

Additionally, the switch searches for the second identification information in the initialization target storing unit upon receipt of the notification from the portable terminal device, replaces the second identification information with the first identification information upon detection of the second identification information, and instructs the portable terminal device into which the user information storing unit to which the first identification information is registered is inserted to initialize data.

Accordingly, even if the user information storing unit is replaced, a data initialization instruction may be issued to the portable terminal device.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention has been described in detail, it may be understood that the various changes, substitutions, and alterations could be made hereto without departing from the spirit and scope of the invention.

What is claimed is:

1. A communication system where two or more portable terminal devices into which a user information storing unit to which information about a user is registered is inserted make a communication via a switch by performing an incoming/outgoing operation using incoming/outgoing information registered to the user information storing unit, the communication system comprising:

a portable terminal device configured to obtain first identification information, assigned to each user information storing unit, from a first user information storing unit upon detection of the first user information storing unit, configured to store the first identification information in a user information history storing unit, configured to obtain the first identification information, and second identification information registered to a second user information storing unit, inserted immediately before the first user information storing unit, from the user information history storing unit, configured to notify the switch of both of the first identification information and the second identification information when the first identification information and the second identification information do not match, and configured to initialize predetermined data within a storing unit included in the portable terminal device itself in accordance with an instruction from the switch; and a switch configured to search for the second identification information in an initialization target storing unit that is a storing unit to which a portable terminal device to be initialized is registered upon receipt of the notification and which is intended to register the identification information registered to the user information storing unit inserted into the portable terminal device, configured to replace the second identification information with the first identification information upon detection of the second identification information, and configured to instruct the portable terminal device into which the user information storing unit to which the first identification information is registered is inserted to initialize data.

2. The communication system according to claim 1, wherein
at least the identification information and the incoming/outgoing information are configured to be registered to the user information storing unit.

3. The communication system according to claim 1, wherein
at least the identification information and the incoming/outgoing information which are registered to the user information storing unit inserted into the portable terminal device to be initialized are configured to be registered to the initialization target storing unit.

4. The communication system according to claim 1, wherein
a notification from the portable terminal device to the switch is configured to be made through a message communication.

5. The communication system according to claim 1, wherein
a data initialization instruction from the switch to the portable terminal device is configured to be issued through a message communication.

6. A method for initializing data of a portable terminal device into which a user information storing unit to which information about a user is registered is inserted and which makes a communication via a switch by performing an incoming/outgoing operation using incoming/outgoing information registered to the user information storing unit, the method comprising:

causing the portable terminal device to obtain first identification information, assigned to each user information storing unit, from a first user information storing unit upon detection of the first user information storing unit, to store the first identification information in a user information history storing unit, to obtain the first identification information and second identification information registered to a second user information storing unit, inserted immediately before the first user information storing unit, from the user information history storing unit, and to report the switch of both of the first identification information and the second identification information when the first identification information and the second identification information do not match; and causing the switch which receives the notification to search for the second identification information in an initialization target storing unit that is a storing unit to which a portable terminal device to be initialized is registered and that is intended to register the identification information registered to the user information storing unit, inserted into the portable terminal device, to replace the second identification information with the first identification information upon detection of the second identification information, and to instruct the portable terminal device into which the user information storing unit to which the first identification information is registered is inserted to initialize data, wherein the portable terminal device initializes the predetermined data within a storing unit included in the portable terminal device itself in accordance with an instruction from the switch.

7. A portable terminal device into which a user information storing unit to which information about a user is registered is inserted, for making a communication via a switch by performing an incoming/outgoing operation using incoming/outgoing information registered to the user information storing unit, the portable terminal device comprising:

a first obtaining unit configured to obtain first identification information, assigned to each user information storing unit, from a first user information storing unit upon detection of the first user information storing unit, a storing unit configured to store the first identification information in a user information history storing unit, a second obtaining unit configured to obtain the first identification information and second identification information registered to a second user information storing unit, inserted immediately before the first user information storing unit, from the user information history storing unit, a notifying unit configured to notify the switch of both of the first identification information and the second identification information when the first identification information and the second identification information do not match, and an initializing unit configured to initialize predetermined data within a storing unit included in the portable terminal device itself when the switch, which receives the notification, detects the second identification information in an initialization target storing unit that is a storing unit to which a portable terminal device to be initialized is registered and that is intended to register the identification information registered to the user information inserted into the portable terminal device, replaces the second identification information with the first identification information, and instructs the portable terminal device into which the user information storing unit to which the first identification information is registered is inserted to initialize the data.

* * * * *